United States Patent [19]

Kollmeier et al.

[11] Patent Number: 4,588,755
[45] Date of Patent: May 13, 1986

[54] PROCESS FOR THE PREPARATION OF FLEXIBLE POLYESTER URETHANE FOAMS

[75] Inventors: Hans-Joachim Kollmeier; Hans-Heinrich Schloens, both of Essen, Fed. Rep. of Germany

[73] Assignee: Th. Goldschmidt AG, Essen, Fed. Rep. of Germany

[21] Appl. No.: 703,736

[22] Filed: Feb. 21, 1985

[30] Foreign Application Priority Data

Feb. 21, 1984 [DE] Fed. Rep. of Germany ....... 3406188

[51] Int. Cl.[4] ...................... C08G 18/14; C08G 18/20
[52] U.S. Cl. .................................. 521/112; 521/116; 521/129
[58] Field of Search ......................... 521/129, 112, 116

[56] References Cited

U.S. PATENT DOCUMENTS

| | | | |
|---|---|---|---|
| 3,108,975 | 10/1963 | Lambert et al. | 260/2.5 |
| 3,563,924 | 2/1971 | Schwarz | 521/129 |
| 3,661,808 | 5/1972 | Kennedy | 521/129 |
| 3,703,489 | 11/1972 | Morehouse | 521/116 |
| 3,796,676 | 3/1974 | Kanner et al. | 521/116 |
| 4,016,113 | 4/1977 | Preston et al. | 260/2.5 |

Primary Examiner—Herbert S. Cockeram
Attorney, Agent, or Firm—Toren, McGeady, Stanger, Goldberg & Kiel

[57] ABSTRACT

In a process of the preparation of flexible polyester urethane foams by reacting polyester polyols having at least two hydroxyl groups in the molecule with at least difunctional polyisocyanates in the presence of water, optionally of physical blowing agents, catalysts, stabilizers and optionally of other conventional additives, the following two components are added for catalysis in the form of a mixture to the reaction formulation in the amounts given (which are based on the polyester polyol):

(a) 0.2 to 1.5 weight percent of N,N'-dimethylpiperazine,
(b) 0.05 to 0.5 weight percent of a polysiloxane-polyoxyalkylene block copolymer of the general formula

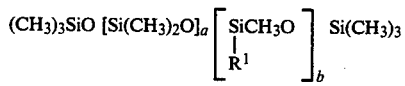

in which
$R^1$ is a polyoxyalkylene radical of the general formula

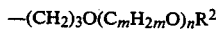

in which
$R^2$ is an alkyl radical with 1 to 4 carbon atoms;
$m=2$ or 3, the average value of m being 2 to 2.5:
$n=$ a whole number corresponding to a molecular weight for the $R^1$ radical of 250 to 1600;
$a=$ is a whole number from 3 to 12; and
$b=$ is a whole number from 3 to 12.

Flexible polyether urethane foams with a high degree of open-cell character are obtained, whose amine odor is clearly reduced.

11 Claims, No Drawings

PROCESS FOR THE PREPARATION OF FLEXIBLE POLYESTER URETHANE FOAMS

BACKGROUND OF THE INVENTION

1. Field of the Invention

The invention relates to a process for the preparation of flexible polyester urethane foams by reacting polyester polyols, having at least two hydroxyl groups in the molecule, with at least difunctional polyisocyanates in the presence of water, and the optional presence of physical blowing agents, catalysts, stabilizers, and other conventional additives.

2. Description of the Prior Art

In the preparation of flexible polyester polyurethane foams, N-alkylmorpholines or dimethylbenzylamine are generally used as catalysts. During the foaming process, these catalysts exhibit a high selectivity for the reaction of the polyisocyanate with water. This selective catalysis is required in order to obtain foams which are as open-celled and non-shrinking as possible. However, such catalysts are disadvantageous in that, on the whole, their catalytic effectiveness is weak. Therefore they have to be added to the foaming formulation in relatively large amounts. This is responsible for the fact that the foams have a strong and unpleasant odor after curing.

As a result, there have been numerous attempts to find other catalysts with less odor. For instance, U.S. Pat. No. 3,954,749 discloses the use of $\beta$-aminocarbonyl compounds, such as, for example, 3-(N-morpholino)-N',N'-dialkylamides.

U.S. Pat. No. 3,925,268 discloses the use of $\beta$-tert.-aminonitriles, e.g., 3-(N,N-dimethylamino)-proprionitrile, as catalysts.

Further compounds are disclosed in U.S. Pat. Nos. 3,821,131, 4,011,223, 4,012,445, 4,038,210, 4,049,931, 4,115,321 and 4,122,038.

European Patent Application No. 0 048 985 describes catalyst mixtures which consist of at least one hydroxyalkylpiperazine and one other tertiary amine.

While these catalysts do have the advantage of reduced odor, they also exhibit a reduced selectivity for the isocyanate-water reaction relative to the polyol-/isocyanate reaction and therefore, lead to a closed cell foam. Moreover, $\beta$-propionitriles are not absolutely physiologically safe.

The use of mixtures of catalysts for the preparation of flexible polyester urethane foams has also been proposed. Mixtures of morpholine derivatives, as selective catalysts for the isocyanate/water reaction and other catalytically active amines have been mentioned in particular. For example, the addition of small amounts of N,N'-dimethylpiperazine to alkylmorpholines is known from European Patent Application No. 0 082 597. The amount added is 0.05 to 0.15 parts by weight for every part by weight of alkylmorpholine. If the amount of N,N'-dimethylpiperazine is increased, polyester foams are obtained which have a reduced open-cell character and which, moreover, tend to shrink. A similar process is described in U.S. Pat. No. 4,326,042, in which a mixture of 5 to 15 parts by weight of N,N-dimethylpiperazine with 20 to 60 parts by weight of N-butylmorpholine and, in addition, 20 to 60 parts by weight of N-methoxypropylmorpholine is mentioned as catalyst for polyester urethane foams. A mixture of 50 to 90 weight percent of 4,4'-dimorpholinodiethyl ether and 50 to 10 weight percent of N,N'-dimethylpiperazine is recommended as catalyst for the production of flexible polyester urethane foams in German Patent No. 21 38 402. It is a common feature of all of these processes that the upper limit to the amount of N,N'-dimethylpiperazine in the catalyst mixture is only 50 weight percent. As a result, the overall amount of amine catalyst to be used remains unreasonably high. It is not possible to increase the proportion of N,N'-dimethylpiperazine in the catalyst mixture, since the polyester foams formed would have a decreased open-cell character. According to the teachings of German Auslegeschrift No. 11 68 633, it is not possible to use N,N'-dimethylpiperazine as the only catalyst, since this would lead to the formation of polyester foams with a non-uniform, coarse cell structure.

A process for the preparation of flexible polyester urethane foams is also known from German Auslegeschrift No. 12 82 949. This is carried out by reacting polyesters having an average of at least two hydroxyl groups per molecule and a hydroxyl number of about 45 to 150, with polyisocyanates in the presence of a blowing agent, polysiloxane-polyoxyalkylene block copolymers as a surface active material, and catalysts for the urethane formation reaction. Block copolymers with a molecular weight of 3,000 to 17,000 and a polysiloxane content of about 14 to 42 weight percent and an oxyethylene content of at least 75 weight percent, based on the total amount of oxyalkylene groups, are used in the polyoxyalkylene block. The polysiloxane block has siloxane groups of the general formula

in which R is a monovalent hydrocarbon radical or a bivalent organic radical and at least one of the R substituents is a bivalent organic radical which is linked to a polyoxyalkylene block and b=1 to and including 3. The catalyst used has a higher activity than that of N-ethylmorpholine. Alternately, block copolymers with a molecular weight of about 3,000 to 7,000 and a polysiloxane content of 14 to 20 weight percent as well as an oxyethylene content of at least 75 weight percent, based on the total amount of oxyalkylene in the polyoxyalkylene block can be used. The polysiloxane block will have siloxane groups of the polysiloxane block of the above-given general formula

which, as above, are linked to the polyoxyalkylene block, and wherein a conventional polyurethane-forming catalyst is used.

This Auslegeschrift does not, however, disclose a rule for the selection of the catalyst, since N-ethylmorpholine is a very weak catalyst and the majority of the catalysts used are more effective than N-ethylmorpholine. As highly active catalysts, compounds, such as, triethylamine, N,N,N',N'-tetramethyl-1,3-butanediamine, triethylenediamine, N,N-dimethylethanolamine, dibutyl tin dilaurate, dibutyl tin di-2-ethylhexoate, tin-(II) octoate or tin(II) oleate are mentioned. It has turned out, however, that foams of inadequate quality may result, if these highly active catalysts and the copolymers mentioned are used. For example, the dimethylethanolamine catalyst leads to core discolorations, while tin octoate and triethylenediamine form closed foams.

SUMMARY OF THE INVENTION

We have discovered a method for the production of flexible polyester urethane foams with a high degree of opencell character which exhibit no or only very little shrinkage and wherein the catalyst or catalyst mixture used does not cause any annoying odor. Moreover, in addition to the high degree of open cell character of the foam and slight shrinkage, the catalyst exhibits good catalytic effectiveness.

More particularly, this is accomplished by adding to the reaction formulation for catalysis, a mixture of the following two components in the amounts given (based on the polyester polyol):

(a) 0.2 to 1.5 weight percent of N,N'-dimethylpiperazine; and (b) 0.05 to 0.5 weight percent of a polysiloxane-polyoxyalkylene block copolymer of the general formula

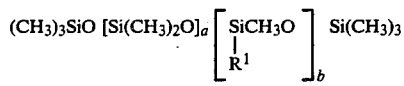

in which $R^1$ is a polyoxyalkylene radical of the general formula

in which $R^2$ is an alkyl radical with 1 to 4 carbon atoms;
m=2 or 3, the average value of m being 2 to 2.5;
n=a whole number corresponding to a molecular weight for the $R^1$ radical of 250 to 1600;
a=is a whole number from 3 to 12; and
b=is a whole number from 3 to 12.

DESCRIPTION OF THE PREFERRED EMBODIMENTS

In a preferred embodiment of the process of the present invention, a mixture of 0.3 to 1.0 weight percent of N,N'-dimethylpiperazine and 0.05 to 0.3 weight percent of polysiloxane-polyoxyalkylene block copolymer of said formula is added to the reaction formulation.

It is of essential importance that the catalytic mixture used in the inventive process contains N,N'-dimethylpiperazine as the predominant or only catalyst in an amount which is significantly above the amount normally used according to the state of the art. The addition of the polysiloxane-polyoxyalkylene block copolymer is responsible for the fact that a foam with the desired degree of open cell character is obtained, in spite of this higher amount of N,N'-dimethylpiperazine and the catalysis it produces. However, the total amount of amine catalyst used is significantly less in the inventive process.

The polysiloxane-polyoxyalkylene block copolymer contained in the mixture for use in the present invention, corresponds to the general formula

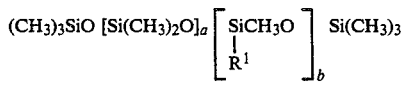

In this formula, a is a whole number from 3 to 12, b is a whole number from 3 to 12, $R^1$ is a polyoxyalkylene radical of the formula

The $R^2$ group is an alkyl group with 1 to 4 carbon atoms, such as, the methyl, ethyl propyl or butyl group; and m is 2 or 3, so that the polyoxyalkylene group may contain oxyethylene and oxypropylene groups. The content of oxyethylene and oxypropylene units is so designed, that m has a value of 2.0 to 2.5 in the average molecule. If the value is 2.0, the polyoxyalkylene group contains only oxyethylene units. If the value of m is 2.5, oxyethylene and oxypropylene units are present in the same molecular proportions.

The value of n is such that the molecular weight of the polyoxyalkylene radical $R^1$ has a value of 250 to 1600.

In order to improve the distribution of the mixture of N,N'-dimethylpiperazine and the polysiloxane-polyoxyalkylene block copolymer, it has proven to be advantageous to add 50 to 200 weight percent, based on the mixture of N,N'-dimethylpiperazine and block copolymer, of nonionic, watersoluble emulsifier to the reaction formulation. The addition products of the reaction of ethylene oxide with alkyl phenols, such as, for example, octylphenol or nonylphenol, or with fatty alcohols, are particularly suitable as water-soluble, nonionic emulsifiers. The amount of ethylene oxide added on must be high enough, so that the addition products become water-soluble. Alkylphenols or fatty alcohols with 8 to 15 moles of ethylene oxide are therefore particularly preferred.

Examples of especially suitable polysiloxane-polyoxyalkylene block copolymers are

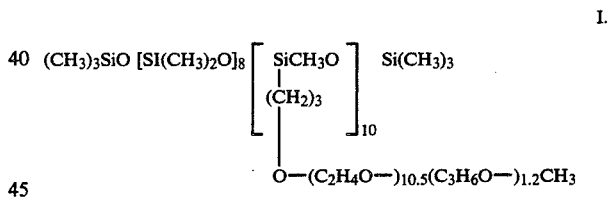

I.

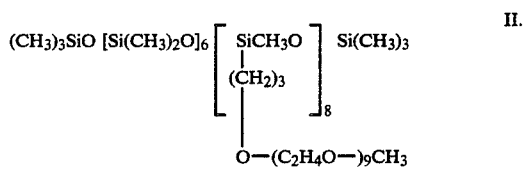

II.

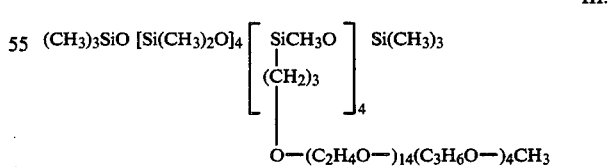

III.

Examples of mixtures to be added according to the invention are (compositon in weight present):

| Mixture of the Present Invention | Block Copolymer | | | N,N'—Dimethyl-piperazine | Nonylphenol + 9 EO |
|---|---|---|---|---|---|
| | I | II | III | | |
| A | 6 | | | 40 | 54 |

-continued

| Mixture of the Present Invention | Block Copolymer I | II | III | N,N'—Dimethyl- piperazine | Nonyl- phenol + 9 EO |
| --- | --- | --- | --- | --- | --- |
| B | 10 | | | 40 | 50 |
| C | | | 10 | 40 | 50 |

In spite of the relatively high N,N'-dimethylpiperazine content, the inventively obtained polyester foams have a high degree of open-cell character and exhibit no or only very slight shrinkage. The odor caused by the use of the catalyst is very slight.

It is, of course, possible to use additional small amounts of conventional, less active catalysts. However, the inventive process permits this addition to be made in such slight concentrations that there is hardly any annoyance due to the odor.

The preparation of flexible polyester urethane foams using catalysts of the state of the art and, for comparison, the inventive mixture, is shown in the following examples. The properties of the foams, so obtained, are compared.

EXAMPLE 1

The mixtures which are to be added according to the invention are examined in the following formulations for flexible polyester polyurethane foams.

| | Parts by Weight |
| --- | --- |
| Polyester polyol (DESMOPHEN ® 2200) | 100 |
| Water | 5.5 |
| TEGOSTAB ® B 5055 stabilizer | 1.0 |
| Amine catalyst | variable |
| Mixture TDI 80/TDI 65 = 7/3 | 65.5 |

The polyester polyol used is a conventional, commercial product (polyethylene adipate) with a hydroxyl number of 60.

The stabilizer TEGOSTAB®B 5055 is a conventional, commercial polysiloxane-polyoxyalkylene block copolymer for stabilizing polyester foams.

TDI 80 and TDI 65 are isomeric mixtures of toluene diisocyanate. TDI 80 is a mixture of the 2,4 and 2,6 isomers in the ratio of 80:20 and TDI 65 is a mixture of the same isomers in the ratio of 65:35.

Foaming is carried out on a Hennecke UBT high-pressure machine with a polyester polyol output capacity of 4 kg/min. Foamed bodies with the dimensions of 27 cm×27 cm×35 cm are prepared and the reaction behavior as well as the physical properties after curing are examined. Foams with N-methylmorpholine and with N,N'-dimethylpiperazine but without the inventive addition of the polysiloxane-polyoxyalkylene block copolymer are prepared for comparison. The results obtained are listed in Table 1.

TABLE 1

| Catalyst | Inventive Mixture A | B | C | N—Methyl- morpholine | N,N'—Dimethyl piperazine | N,N'—dimethyl piperazine/ ethoxylated nonylphenol-1/1 |
| --- | --- | --- | --- | --- | --- | --- |
| Parts by weight per 100 parts by weight of polyol | 1.5 | 1.5 | 1.5 | 1.5 | 0.60 | 1.2 |
| Creaming time sec. | 9 | 9 | 9 | 8 | 9 | 9 |
| Rise time sec. | 67 | 66 | 67 | 66 | 67 | 68 |
| Specific gravity kg/m$^3$ | 20.0 | 20.2 | 20.0 | 20.4 | 19.4 | 19.5 |
| Cells/cm | 20 | 21 | 20 | 20 | 20 | 19 |
| Air permeability in mbar | 16 | 8 | 6 | 9 | 29 | 28 |
| Odor | slight | slight | slight | strong | slight | slight |

The air permeability is measured as the dynamic pressure in millibar (mbar) which is built up when a constant stream of air of 8 l/min is passed through a piece of foam 5 cm thick by means of a nozzle having a diameter of 5 mm. The lower the numerical value, the more open-celled is the foam. The results show that the polyester foams which are obtained with the mixtures that are to be added inventively have properties that, in respect to their reaction behavior and their open-cell character, are similar to those of foams prepared with N-methylmorpholine. These foams, however, have the additional advantage that the detectable amine odor after curing is clearly reduced.

EXAMPLE 2

For comparison with the teachings of German Auslegeschrift No. 12 82 949, the triethylenediamine, N,N,N',N'-tetramethylbutanediamine, N,N-dimethylethanolamine, and tin(II) octoate catalysts are compared with N,N'-dimethylpiperazine. In each case, the catalyst is used in admixture with 0.1 parts by weight, based on 100 parts by weight of polyol, of block copolymer I, in the following formulation:

| | Parts by Weight |
| --- | --- |
| Polyester polyol (DESMOPHEN ® 2200) | 100 |
| Water | 4.5 |
| TEGOSTAB ® B 5055 stabilizer | 1.0 |
| Amine catalyst | variable |
| Toluene diisocyanate TDI 80 | 55.5 |

The amount of the individual catalysts used is selected so that approximately equal rise times result.

The following results are obtained:

TABLE 2

| Catalyst | Triethylene- diamine | Tetramethyl- butanediamine | Dimethyl- ethanolamine | Tin (II) octoate | Dimethyl piperazine |
| --- | --- | --- | --- | --- | --- |
| Parts by Weight | 0.18 | 0.3 | 0.4 | 0.21 | 0.45 |

TABLE 2-continued

| Catalyst | Triethylene-diamine | Tetramethyl-butanediamine | Dimethyl-ethanolamine | Tin (II) octoate | Dimethyl piperazine |
| --- | --- | --- | --- | --- | --- |
| Rise Time, sec. | 122 | 120 | 118 | 120 | 121 |
| Air Permeability mbar | 38 (shrinkage) | 28 | 17 | 25 | 10 |
| Core Discoloration | — | — | strong | — | — |

The results show that, relative to other active catalysts, dimethylipiperazine produces clear advantages in respect to the open-cell character and the tendency for the core to discolor.

We claim:

1. In a process for the preparation of flexible polyester urethane foams by reacting polyester polyols having at least two hydroxyl groups in the molecule with at least difunctional polyisocyanates in the presence of water and a catalyst, the improvement comprising employing as said catalyst a mixture of
   (a) 0.2 to 1.5 weight percent of N,N'-dimethylpiperazine; and
   (b) 0.05 to 0.5 weight percent of a polysiloxane-polyoxyalkylene block copolymer of the general formula

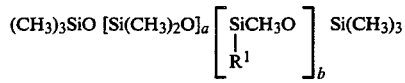

in which
R$^1$ is a polyoxyalkylene radical of the general formula

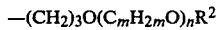

in which
R$^2$ is an alkyl radical with 1 to 4 carbon atoms;
m=2 or 3, the average value of m being 2 to 2.5;
n=a whole number corresponding to a molecular weight for the R$^1$ radical of 250 to 1600;
a=is a whole number from 3 to 12; and
b=is a whole number from 3 to 12;
wherein the amounts in the mixture are based on the polyester polyol.

2. The process of claim 1 wherein the mixture contains 0.3 to 1.0 weight percent of N,N'-dimethylpiperazine and 0.05 to 0.3 weight percent of polysiloxane-polyoxyalkylene block copolymer.

3. The process of claim 1 or 2 wherein the reaction mixture further contains a nonionic, water-soluble emulsifier in an amount of 50 to 200 weight percent, based on the mixture of N,N'-dimethylpiperazine and block copolymer.

4. The process of claim 1 wherein the reaction mixture further contains additives selected from the group consisting of blowing agents and stabilizers.

5. The process of claim 1, 2, or 4, wherein R$^2$ is selected from the group consisting of methyl, ethyl, propyl and butyl.

6. The process of claim 3 wherein the emulsifier is an addition product of the reaction of ethylene oxide with alkyl phenols or fatty alcohols.

7. The process of claim 6 wherein the amount of ethylene oxide added is from 8 to 15 moles.

8. The process of claim 6 wherein the alkyl phenol is octylphenol or nonylphenol.

9. The process of claim 7 wherein the alkyl phenol is octylphenol or nonylphenol.

10. A foam prepared by the process of claim 1, 2, or 4.

11. A foam prepared by the process of claim 3.

* * * * *